(12) United States Patent
Bae et al.

(10) Patent No.: US 11,894,575 B2
(45) Date of Patent: Feb. 6, 2024

(54) CROSS-LINKED POLYOLEFIN SEPARATOR AND METHOD FOR PRODUCING SAME

(71) Applicant: LG Chem, Ltd., Seoul (KR)

(72) Inventors: Won-Sik Bae, Daejeon (KR); Joo-Sung Lee, Daejeon (KR); Bi-Oh Ryu, Daejeon (KR); A-Young Lee, Daejeon (KR)

(73) Assignee: LG Chem, Ltd.

( * ) Notice: Subject to any disclaimer, the term of this patent is extended or adjusted under 35 U.S.C. 154(b) by 589 days.

(21) Appl. No.: 16/963,381

(22) PCT Filed: Sep. 11, 2019

(86) PCT No.: PCT/KR2019/011867
§ 371 (c)(1),
(2) Date: Jul. 20, 2020

(87) PCT Pub. No.: WO2020/055188
PCT Pub. Date: Mar. 19, 2020

(65) Prior Publication Data
US 2021/0234229 A1 Jul. 29, 2021

(30) Foreign Application Priority Data

Sep. 11, 2018 (KR) .................. 10-2018-0108562
Nov. 2, 2018 (KR) .................. 10-2018-0133814
May 21, 2019 (KR) .................. 10-2019-0059518

(51) Int. Cl.
*H01M 50/417* (2021.01)
*B29C 48/00* (2019.01)
*H01M 50/406* (2021.01)
*H01M 50/491* (2021.01)
*H01M 10/0525* (2010.01)
*B29K 23/00* (2006.01)

(52) U.S. Cl.
CPC ....... *H01M 50/417* (2021.01); *B29C 48/0018* (2019.02); *B29C 48/022* (2019.02); *H01M 10/0525* (2013.01); *H01M 50/406* (2021.01); *H01M 50/491* (2021.01); *B29K 2023/0633* (2013.01)

(58) Field of Classification Search
CPC ............. H01M 50/417; H01M 50/406; H01M 50/491; B29C 48/0018; B29C 48/022
USPC .................................. 429/249, 254
See application file for complete search history.

(56) References Cited

U.S. PATENT DOCUMENTS

| 4,576,993 A * | 3/1986 | Tamplin ............. H01M 50/489 525/240 |
| 6,177,181 B1 | 1/2001 | Hamada et al. |
| 2007/0117933 A1 | 5/2007 | Giacobbi et al. |
| 2009/0061215 A1 | 3/2009 | Baumgart et al. |
| 2009/0280310 A1 | 11/2009 | Nitta et al. |
| 2012/0091620 A1 * | 4/2012 | Mahabir ............. C08F 8/42 525/263 |
| 2013/0206224 A1 | 8/2013 | Naumovitz et al. |
| 2013/0233383 A1 | 9/2013 | Naumovitz et al. |
| 2015/0314509 A1 | 11/2015 | Toullec et al. |
| 2016/0126518 A1 | 5/2016 | Park et al. |
| 2017/0005214 A1 | 1/2017 | Yoshitake et al. |
| 2018/0163024 A1 * | 6/2018 | Gopalan ............. C08F 8/12 |

FOREIGN PATENT DOCUMENTS

| CN | 102918098 A | 2/2013 | |
| CN | 103956451 A | 7/2014 | |
| CN | 104241571 A | 12/2014 | |
| CN | 105576172 A | 5/2016 | |
| CN | 106414592 A | 2/2017 | |
| CN | 106920912 A | 7/2017 | |
| JP | H11144700 A | 5/1999 | |
| JP | H11172036 A | 6/1999 | |
| JP | 2002249593 A | 9/2002 | |
| JP | 2004079515 A | 3/2004 | |
| JP | 2017218478 A | 12/2017 | |
| KR | 910009866 B1 | 12/1991 | |
| KR | 950013728 B1 | 11/1995 | |
| KR | 20060123275 A | 12/2006 | |
| KR | 20130009435 A | 1/2013 | |
| KR | 20150021557 A | 3/2015 | |
| KR | 20160038918 A | 4/2016 | |
| KR | 2016129583 A * | 11/2016 | ......... H01M 10/052 |
| KR | 20160129580 A | 11/2016 | |
| KR | 20160129583 A | 11/2016 | |
| KR | 20160146134 A | 12/2016 | |
| KR | 101731747 B1 | 4/2017 | |
| KR | 20180033487 A | 4/2018 | |
| KR | 20180111329 A | 10/2018 | |

(Continued)

OTHER PUBLICATIONS

Search Report for Chinese Application No. 201980008923.2 dated Oct. 21, 2021. 4 pgs.

(Continued)

*Primary Examiner* — Sean P Cullen

(74) *Attorney, Agent, or Firm* — Lerner David LLP

(57) ABSTRACT

A crosslinked polyolefin separator having an average value of light transmittance of 30% or more in a region of 380 nm to 700 nm, after four sides of the separator are fixed and allowed to stand at 130° C. for 30 minutes. A method for manufacturing the crosslinked polyolefin separator is also provided. The crosslinked polyolefin separator has a low shutdown temperature to provide improved safety. The crosslinked polyolefin separator also has a high meltdown temperature and is inhibited from die-drooling.

18 Claims, No Drawings

(56) References Cited

FOREIGN PATENT DOCUMENTS

| KR | 101982161 B1 | 5/2019 | | |
|---|---|---|---|---|
| KR | 2037342 B1 | * | 10/2019 | ............... B05D 7/24 |

OTHER PUBLICATIONS

International Search Report for Application No. PCT/KR2019/011867 dated Jan. 13, 2020, 2 pages.

* cited by examiner

CROSS-LINKED POLYOLEFIN SEPARATOR AND METHOD FOR PRODUCING SAME

CROSS-REFERECE TO RELATED APPLICATIONS

The present application is a national phase entry under 35 U.S.C. § 371 of International Application No.: PCT/KR2019/011867 which claims priority from Korean Patent Application No. 10-2018-0108562 filed on Sep. 11, 2018, Korean Patent Application No. 10-2018-0133814 filed on Nov. 2, 2018 and Korean Patent Application No. 10-2019-0059518 filed on May 21, 2019 in the Republic of Korea, the disclosures of which are incorporated herein by reference in their entirety.

TECHNICAL FIELD

The present disclosure relates to a crosslinked polyolefin separator and a method for manufacturing the same.

BACKGROUND ART

Recently, energy storage technology has been given an increasing attention. Efforts into research and development for electrochemical devices have been actualized more and more, as the application of energy storage technology has been extended to energy for cellular phones, camcorders and notebook PC and even to energy for electric vehicles. In this context, electrochemical devices have been most spotlighted. Among such electrochemical devices, development of rechargeable secondary batteries has been focused. More recently, active studies have been conducted about designing a novel electrode and battery in order to improve the capacity density and specific energy in developing such batteries.

Among the commercially available secondary batteries, lithium secondary batteries developed in the early 1990's have been spotlighted, since they have a higher operating voltage and significantly higher energy density as compared to conventional batteries, such as Ni-MH, Ni—Cd and sulfuric acid-lead batteries using an aqueous electrolyte.

Such a lithium secondary battery includes a positive electrode, a negative electrode, an electrolyte and a separator. Particularly, it is required for the separator to have insulation property for separating the positive electrode and the negative electrode from each other and high ion conductivity for increasing lithium ion permeability based on high porosity.

In addition, it is required for the separator to have a broad interval between a shutdown temperature and a meltdown temperature so that a lithium secondary battery including the separator may ensure safety. To broaden the interval between a shutdown temperature and a meltdown temperature, it is required that the shutdown temperature is controlled to be decreased and the meltdown temperature is controlled to be increased. As the meltdown temperature is increased, the separator has a higher melting temperature to provide improved stability. As the shutdown temperature is decreased, pore blocking may occur at a lower temperature. The shutdown temperature may be determined by the light transmittance of the separator. The method for manufacturing a crosslinked polyolefin porous membrane according to the related art shows an insufficient effect of increasing the light transmittance.

DISCLOSURE

Technical Problem

The present disclosure is designed to solve the problems of the related art, and therefore the present disclosure is directed to providing a method for manufacturing a crosslinked polyolefin separator which has a high meltdown temperature and shows improved processability by preventing a die-drool phenomenon, and a separator obtained by the method.

The present disclosure is also directed to providing a method for manufacturing a crosslinked polyolefin separator having high light transmittance and ensuring safety, and a separator obtained by the method.

Technical Solution

In one aspect of the present disclosure, there is provided a crosslinked polyolefin separator according to any one of the following embodiments.

According to the first embodiment of the present disclosure, there is provided a crosslinked polyolefin separator, which shows an average value of light transmittance of 30% or more in a region of 380 nm to 700 nm, after four sides of the separator are fixed and allowed to stand at 130° C. for 30 minutes.

According to the second embodiment of the present disclosure, there is provided the crosslinked polyolefin separator as defined in the first embodiment, which shows an average value of light transmittance of 58% or more in a region of 380 nm to 700 nm, after four sides of the separator are fixed and allowed to stand at 130° C. for 30 minutes.

In another aspect of the present disclosure, there is provided a crosslinked polyolefin separator according to any one of the following embodiments.

According to the third embodiment of the present disclosure, there is provided a crosslinked polyolefin separator, which has 0.5-10 grafted units based on 1000 carbon atoms in the polyolefin backbone forming the crosslinked polyolefin separator.

According to the fourth embodiment of the present disclosure, there is provided the crosslinked polyolefin separator as defined in the third embodiment, which has 1.0-8.0 grafted units based on 1000 carbon atoms in the polyolefin backbone forming the crosslinked polyolefin separator.

According to the fifth embodiment of the present disclosure, there is provided the crosslinked polyolefin separator as defined in the third or the fourth embodiment, wherein the grafted units are silane-grafted units.

According to the sixth embodiment of the present disclosure, there is provided the crosslinked polyolefin separator as defined in the first to the fifth embodiments, which has a thickness of 4.0-12.0 μm.

In still another aspect of the present disclosure, there is provided a method for manufacturing a crosslinked polyolefin separator according to any one of the following embodiments.

According to the seventh embodiment of the present disclosure, there is provided a method for manufacturing a crosslinked polyolefin separator, including the steps of:

(S1) introducing polyolefin, a diluting agent, alkoxysilane containing a carbon-carbon double bonded group, an initiator and a crosslinking catalyst to an extruder, followed by mixing, and carrying out reactive extrusion;

(S2) molding and orienting the reactive extruded silane-grafted polyolefin composition in the form of a sheet;

(S3) extracting the diluting agent from the oriented sheet to obtain a porous membrane;

(S4) thermally fixing the porous membrane; and (S5) crosslinking the thermally fixed porous membrane in the presence of water, wherein at least one of the initiator or the alkoxysilane containing a carbon-carbon double bonded group is introduced and mixed in divided doses at a predetermined time interval, in step (S1), and the weight ratio (A/B) of the total content (A) of the alkoxysilane containing a carbon-carbon double bonded group to the total content (B) of the initiator is 80-600, or the alkoxysilane containing a carbon-carbon double bonded group introduced previously to the extruder has a higher boiling point, as compared to the alkoxysilane containing a carbon-carbon double bonded group introduced subsequently to the extruder.

According to the eighth embodiment of the present disclosure, there is provided the method for manufacturing a crosslinked polyolefin separator as defined in the seventh embodiment, wherein step (S1) includes:

(S11) introducing polyolefin and a first diluting agent to an extruder, followed by mixing;

(S12) introducing a second diluting agent, a first alkoxysilane containing a carbon-carbon double bonded group, an initiator and a crosslinking catalyst to the extruder, followed by mixing; and (S13) introducing a third diluting agent and a second alkoxysilane containing a carbon-carbon double bonded group to the extruder, followed by mixing, and carrying out reactive extrusion of a silane-grafted polyolefin composition, wherein the first alkoxysilane containing a carbon-carbon double bonded group has a higher boiling point as compared to the second alkoxysilane containing a carbon-carbon double bonded group.

According to the ninth embodiment of the present disclosure, there is provided the method for manufacturing a crosslinked polyolefin separator as defined in the eighth embodiment, wherein the first alkoxysilane containing a carbon-carbon double bonded group has a boiling point of 150-200° C., and the second alkoxysilane containing a carbon-carbon double bonded group has a boiling point of 70-140° C.

According to the tenth embodiment of the present disclosure, there is provided the method for manufacturing a crosslinked polyolefin separator as defined in any one of the seventh to the ninth embodiments, wherein the weight ratio of the first alkoxysilane containing a carbon-carbon double bonded group to the second alkoxysilane containing a carbon-carbon double bonded group is 8:2-2:8.

According to the eleventh embodiment of the present disclosure, there is provided the method for manufacturing a crosslinked polyolefin separator as defined in any one of the seventh to the tenth embodiments, wherein the first alkoxysilane containing a carbon-carbon double bonded group includes any one of vinyltriethoxysilane, vinyltriisopropoxysilane and vinyltriacetoxysilane, or a mixture of at least two of them.

According to the twelfth embodiment of the present disclosure, there is provided the method for manufacturing a crosslinked polyolefin separator as defined in any one of the seventh to the eleventh embodiments, wherein the second alkoxysilane containing a carbon-carbon double bonded group includes any one of vinyltrimethoxysilane and vinylchloro(dimethyl)silane, or a mixture thereof.

According to the thirteenth embodiment of the present disclosure, there is provided the method for manufacturing a crosslinked polyolefin separator as defined in any one of the seventh to the twelfth embodiments, wherein each of the first diluting agent, the second diluting agent and the third diluting agent independently includes liquid paraffin oil, solid paraffin oil, mineral oil, wax, soybean oil, phthalic acid ester, aromatic ether, C10-C20 fatty acid, C10-C20 fatty acid alcohol, fatty acid ester, or a mixture of at least two of them.

According to the fourteenth embodiment of the present disclosure, there is provided the method for manufacturing a crosslinked polyolefin separator as defined in any one of the seventh to the thirteenth embodiments, wherein the weight ratio of the first diluting agent to the second diluting agent is 4:3-7:1.5.

According to the fifteenth embodiment of the present disclosure, there is provided the method for manufacturing a crosslinked polyolefin separator as defined in any one of the seventh to the fourteenth embodiments, wherein the weight ratio of the first diluting agent to the third diluting agent is 4:3-7:1.5.

According to the sixteenth embodiment of the present disclosure, there is provided the method for manufacturing a crosslinked polyolefin separator as defined in any one of the seventh to the fourteenth embodiments, wherein the ratio of the elapsed time from the introduction of the first alkoxysilane containing a carbon-carbon double bonded group to the extrusion based on the elapsed time from the introduction of the polyolefin to the extrusion is 0.6-0.9.

According to the seventeenth embodiment of the present disclosure, there is provided the method for manufacturing a crosslinked polyolefin separator as defined in any one of the seventh to the sixteenth embodiments, wherein the ratio of the elapsed time from the introduction of the second alkoxysilane containing a carbon-carbon double bonded group to the extrusion based on the elapsed time from the introduction of the polyolefin to the extrusion is 0.2-0.5.

According to the eighteenth embodiment of the present disclosure, there is provided the method for manufacturing a crosslinked polyolefin separator as defined in any one of the seventh to the seventeenth embodiments, wherein the content of the first alkoxysilane containing a carbon-carbon double bonded group is 0.1-3.0 part by weight based on 100 parts by weight of the total content of the polyolefin, the first diluting agent, the second diluting agent and the third diluting agent.

According to the nineteenth embodiment of the present disclosure, there is provided the method for manufacturing a crosslinked polyolefin separator as defined in any one of the seventh to the eighteenth embodiments, wherein the content of the second alkoxysilane containing a carbon-carbon double bonded group is 0.1-3.0 part by weight based on 100 parts by weight of the total content of the polyolefin, the first diluting agent, the second diluting agent and the third diluting agent.

According to the twentieth embodiment of the present disclosure, there is provided the method as defined in the seventh embodiment for manufacturing the crosslinked polyolefin separator as defined in any one of the seventh to the nineteenth embodiments, wherein step (S5) is carried out at 60-90° C. under a relative humidity of 50-85% for 6-18 hours.

According to the twenty-first embodiment of the present disclosure, there is provided the method for manufacturing a crosslinked polyolefin separator as defined in the seventh embodiment, wherein step (S1) is carried out by introducing and mixing the initiator to the extruder in divided doses at a predetermined time interval, and the weight ratio (A/B) of the total content (A) of the alkoxysilane containing a carbon-carbon double bonded group to the total content (B) of the initiator is 80-600.

According to the twenty-second embodiment of the present disclosure, there is provided the method for manufacturing a crosslinked polyolefin separator as defined in the twenty-first embodiment, wherein, in step (S1), the initiator is introduced to the extruder together with at least one of the diluting agent, alkoxysilane containing a carbon-carbon double bonded group or the crosslinking catalyst, and is introduced and mixed in divided doses at a predetermined time interval.

According to the twenty-third embodiment of the present disclosure, there is provided the method for manufacturing a crosslinked polyolefin separator as defined in the twenty-first or the twenty-second embodiment, wherein step (S1) includes:

introducing the polyolefin to the extruder;

introducing a pre-introduced composition containing a part of the diluting agent, initiator, alkoxysilane containing a carbon-carbon double bonded group and the crosslinking catalyst to the extruder, followed by mixing; and introducing a post-introduced composition containing the remaining part of the diluting agent, initiator, alkoxysilane containing a carbon-carbon double bonded group and the crosslinking catalyst to the extruder at a predetermined time interval, followed by mixing, and then carrying out reactive extrusion of a silane-grafted polyolefin composition, wherein the weight ratio (a/b) of the alkoxysilane (a) containing a carbon-carbon double bonded group to the initiator (b) in the pre-introduced composition is 100-700, and the weight ratio (c/d) of the alkoxysilane (c) containing a carbon-carbon double bonded group to the initiator (d) in the post-introduced composition is smaller than the weight ratio (a/b) of the alkoxysilane (a) containing a carbon-carbon double bonded group to the initiator (b) in the pre-introduced composition.

According to the twenty-fourth embodiment of the present disclosure, there is provided the method for manufacturing a crosslinked polyolefin separator as defined in the twenty-third embodiment, wherein the weight ratio (c/d) of the alkoxysilane (c) containing a carbon-carbon double bonded group to the initiator (d) in the post-introduced composition is 20-400.

According to the twenty-fifth embodiment of the present disclosure, there is provided the method for manufacturing a crosslinked polyolefin separator as defined in the twenty-third or the twenty-fourth embodiment, wherein the weight ratio (a/b) of the alkoxysilane (a) containing a carbon-carbon double bonded group to the initiator (b) in the pre-introduced composition is 3-15 times higher than the weight ratio (c/d) of the alkoxysilane (c) containing a carbon-carbon double bonded group to the initiator (d) in the post-introduced composition.

According to the twenty-sixth embodiment of the present disclosure, there is provided the method for manufacturing a crosslinked polyolefin separator as defined in any one of the twenty-third to the twenty-fifth embodiments, wherein the ratio (t2/t1) of the elapsed time (t2) from the introduction of the post-introduced composition to the extrusion based on the elapsed time (t1) from the introduction of the pre-introduced composition to the extrusion is 0.3-0.8.

According to the twenty-seventh embodiment of the present disclosure, there is provided the method for manufacturing a crosslinked polyolefin separator as defined in any one of the twenty-first to the twenty-sixth embodiments, wherein the alkoxysilane containing a carbon-carbon double bonded group includes a compound represented by the following Chemical Formula 1:

[Chemical Formula 1]

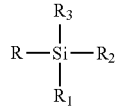

wherein each of $R_1$, $R_2$ and $R_3$ independently represents a C1-C10 alkoxy group or C1-C10 alkyl group, with the proviso that at least one of $R_1$, $R_2$ or $R_3$ represents an alkoxy group; and R represents a vinyl group, acryloxy group, methacryloxy group, or a C1-C20 alkyl group, wherein at least one hydrogen atom of the alkyl group is substituted with a vinyl group, acryl group, or methacryl group.

According to the twenty-eighth embodiment of the present disclosure, there is provided the method for manufacturing a crosslinked polyolefin separator as defined in the twenty-seventh embodiment, wherein the alkoxysilane containing a carbon-carbon double bonded group includes vinyltrimethoxysilane, vinyltriethoxysilane, vinyltriacetoxysilane, (3-methacryloxypropyl)trimethoxysilane, (3-methacryloxypropyl)triethoxysilane, vinylmethyl dimethoxysilane, vinyl-tris(2-methoxyethoxy)silane, vinylmethyldiethoxysilane, or a mixture of at least two of them.

According to the twenty-ninth embodiment of the present disclosure, there is provided the method for manufacturing a crosslinked polyolefin separator as defined in any one of the seventh to the twenty-eighth embodiments, wherein the initiator includes 2,5-dimethyl-2,5-di(tert-butylperoxy)hexane (DHBP), benzoyl peroxide, acetyl peroxide, dilauryl peroxide, di-tert-butyl peroxide, dicumyl peroxide, cumyl peroxide, hydrogen peroxide, potassium persulfate, or a mixture of at least two of them.

According to the thirtieth embodiment of the present disclosure, there is provided the method for manufacturing a crosslinked polyolefin separator as defined in any one of the seventh to the twenty-ninth embodiments, wherein the diluting agent includes liquid paraffin oil, solid paraffin oil, mineral oil, wax, soybean oil, phthalic acid ester, aromatic ether, C10-C20 fatty acid, C10-C20 fatty acid alcohol, fatty acid ester, or a mixture of at least two of them.

According to the thirty-first embodiment of the present disclosure, there is provided the method for manufacturing a crosslinked polyolefin separator as defined in the twenty-third embodiment, wherein the weight ratio (a/b) of the alkoxysilane (a) containing a carbon-carbon double bonded group to the initiator (b) in the pre-introduced composition is 300-600.

According to the thirty-second embodiment of the present disclosure, there is provided the method for manufacturing a crosslinked polyolefin separator as defined in the twenty-third embodiment, wherein the weight ratio (c/d) of the alkoxysilane (c) containing a carbon-carbon double bonded group to the initiator (d) in the post-introduced composition is 57.1-66.7.

Advantageous Effects

The method for manufacturing a crosslinked polyolefin separator according to an embodiment of the present disclosure can provide a crosslinked polyolefin separator having a high meltdown temperature through a silane aqueous crosslinking process.

In the method for manufacturing a crosslinked polyolefin separator according to an embodiment of the present disclosure, the first alkoxysilane containing a carbon-carbon double bonded group, which has a higher boiling point, is introduced previously and the second alkoxysilane containing a carbon-carbon double bonded group, which has a lower boiling point, is introduced subsequently. In this manner, it is possible to improve heat resistance characteristics and processability, and to provide a crosslinked polyolefin separator prevented from die-drooling.

In the method for manufacturing a crosslinked polyolefin separator according to an embodiment of the present disclosure, the total content of alkoxysilane containing a carbon-carbon double bonded group based on the total content of the initiator is controlled so that silane grafting may be formed to an adequate Si grafting ratio. Thus, as can be seen from an increase in light transmittance of a separator, it is possible to provide improved safety and processability to the separator. In addition, it is possible to inhibit a die-drool phenomenon caused by excessive use of alkoxysilane containing a carbon-carbon double bonded group.

In the method for manufacturing a crosslinked polyolefin separator according to an embodiment of the present disclosure, the weight ratio of the alkoxysilane containing a carbon-carbon double bonded group to the initiator and the introduction time point thereof are controlled so that silane grafting may be formed at an adequate Si grafting ratio. In this manner, as can be seen from an increase in light transmittance of a separator, it is possible to provide a crosslinked polyolefin separator ensuring safety, and to improve processability. It is also possible to inhibit side reactions resulting from direct polyolefin crosslinking caused by the initiator.

DETAILED DESCRIPTION

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

As used herein, the expression 'one portion is connected to another portion' covers not only 'a portion is directly connected to another portion' but also 'one portion is connected electrically to another portion' by way of the other element interposed between them.

Throughout the specification, the expression 'a part [includes] an element' does not preclude the presence of any additional elements but means that the part may further include the other elements.

In addition, it will be understood that the terms "comprises" and/or "comprising", or "includes" and/or "including" when used in this specification, refer to the presence of any stated shapes, numbers, steps, operations, members, elements and/or groups thereof, but do not preclude the addition of one or more other shapes, numbers, steps, operations, members, elements and/or groups thereof.

As used herein, the terms 'approximately', 'substantially', or the like, are used as meaning contiguous from or to the stated numerical value, when an acceptable preparation and material error unique to the stated meaning is suggested, and are used for the purpose of preventing an unconscientious invader from unduly using the stated disclosure including an accurate or absolute numerical value provided to help understanding of the present disclosure.

As used herein, the term 'combination(s) thereof' included in any Markush-type expression means a combination or mixture of one or more elements selected from the group of elements disclosed in the Markush-type expression, and refers to the presence of one or more elements selected from the group.

As used herein, the expression 'A and/or B' means 'A, B or both of them'.

In one aspect of the present disclosure, there are provided a method for manufacturing a crosslinked polyolefin separator and a crosslinked polyolefin separator obtained thereby.

A separator used for a lithium secondary battery shows excellent safety, when it has a large difference between the shutdown temperature and meltdown temperature. Herein, in order to broaden the interval between them, it is required that the shutdown temperature is controlled to be decreased and the meltdown temperature is controlled to be increased.

Methods for increasing the meltdown temperature include adding alkoxysilane containing a carbon-carbon double bonded group to polyolefin and a diluting agent to prepare a silane-grafted polyolefin composition from which a separator is obtained.

However, when the above-mentioned materials are introduced to and mixed in an extruder at once, it is difficult to control the process due to a die-drool phenomenon, etc. during the manufacture, thereby providing a separator having non-uniform appearance.

To solve the above-mentioned problem, an embodiment of the present disclosure is directed to providing a crosslinked polyolefin separator, which ensures processability and workability by reducing a die-drool phenomenon, as well as has a high meltdown temperature.

Meanwhile, as the shutdown temperature is decreased, pore blocking may occur at a lower temperature. When pore blocking occurs at a lower temperature, it is possible to improve the safety of an electrochemical device. Under these circumstances, it is required to provide a separator having a low shutdown temperature. The shutdown temperature may be determined through light transmittance. However, when polyolefin, a diluting agent, an initiator, a crosslinking agent and a crosslinking catalyst are introduced at once according to the related art, the resultant separator still shows low light transmittance. Thus, it is required to solve the above-mentioned problem.

Therefore, one aspect of the present disclosure is directed to providing a method for manufacturing a crosslinked polyolefin separator having high light transmittance and improved safety, and a crosslinked polyolefin separator obtained thereby.

In one aspect of the present disclosure, there is provided a method for manufacturing a crosslinked polyolefin separator, including the steps of:

(S1) introducing polyolefin, a diluting agent, alkoxysilane containing a carbon-carbon double bonded group, an initiator and a crosslinking catalyst to an extruder, followed by mixing, and carrying out reactive extrusion;

(S2) molding and orienting the reactive extruded silane-grafted polyolefin composition in the form of a sheet;

(S3) extracting the diluting agent from the oriented sheet to obtain a porous membrane;

(S4) thermally fixing the porous membrane; and (S5) crosslinking the thermally fixed porous membrane in the presence of water, wherein at least one of the initiator or the alkoxysilane containing a carbon-carbon double bonded group is introduced and mixed in divided doses at a predetermined time interval, in step (S1), and the weight ratio (A/B) of the total content (A) of the alkoxysilane containing a carbon-carbon double bonded group to the total content (B) of the initiator is 80-600, or the alkoxysilane containing a carbon-carbon double bonded group introduced previously to the extruder has a higher boiling point, as compared to the alkoxysilane containing a carbon-carbon double bonded group introduced subsequently to the extruder.

Hereinafter, the method for manufacturing a crosslinked polyolefin separator according to the present disclosure will be explained in detail.

According to an embodiment of the present disclosure, in step (S1), at least one of the initiator or the alkoxysilane containing a carbon-carbon double bonded group is introduced and mixed in divided doses at a predetermined time interval. Herein, when the alkoxysilane containing a carbon-carbon double bonded group is introduced in divided doses, the alkoxysilane containing a carbon-carbon double bonded group introduced previously to the extruder has a higher boiling point as compared to the alkoxysilane containing a carbon-carbon double bonded group introduced subsequently to the extruder. Meanwhile, when the initiator is introduced in divided doses, the weight ratio of the total content of the initiator based on the total content of the alkoxysilane containing a carbon-carbon double bonded group is controlled to a predetermined range.

According to an embodiment of the present disclosure, the alkoxysilane containing a carbon-carbon double bonded group may be introduced in divided doses at a predetermined time interval. This embodiment will be explained in detail hereinafter.

When the alkoxysilane containing a carbon-carbon double bonded group is introduced in divided doses, first, polyolefin, the diluting agent, alkoxysilane containing a carbon-carbon double bonded group, initiator and the crosslinking agent may be introduced to and mixed in the extruder. In a variant, polyolefin and the first diluting agent may be introduced to the extruder first (S11), and then the second diluting agent, the first alkoxysilane containing a carbon-carbon double bonded group, initiator and the crosslinking catalyst may be introduced to and mixed in the extruder (S12). According to an embodiment of the present disclosure, in order to effectively blend the alkoxysilane containing a carbon-carbon double bonded group with the molten materials in the extruder, polyolefin and the first diluting agent may be introduced first to the extruder, and then the first alkoxysilane containing a carbon-carbon double bonded group may be introduced thereto, or polyolefin and the diluting agent are introduced first to the extruder, and then the diluting agent, alkoxysilane containing a carbon-carbon double bonded group, initiator and the crosslinking catalyst may be introduced thereto, followed by mixing.

According to the related art, a diluting agent, initiator, alkoxysilane containing a carbon-carbon double bonded group (crosslinking agent) and a crosslinking catalyst are introduced to and mixed in an extruder at once, and then reactive extrusion is carried out to obtain a silane-grafted polyolefin composition.

However, according to the related art, there is a problem related with long-term processability due to die-drool during the manufacture of a separator.

Thus, the inventors of the present disclosure have conducted intensive studies to improve the processability of a crosslinked polyolefin separator. It has been found that when the retention time of the alkoxysilane containing a carbon-carbon double bonded group is controlled, considering the boiling point thereof, it is possible to provide a separator with a high meltdown temperature and to improve the appearance-related problem caused by a die-drool phenomenon. The present disclosure is based on this finding.

According to an embodiment of the present disclosure, step (S1) may include:

(S11) introducing polyolefin and a first diluting agent to an extruder, followed by mixing;

(S12) introducing a second diluting agent, a first alkoxysilane containing a carbon-carbon double bonded group, an initiator and a crosslinking catalyst to the extruder, followed by mixing; and (S13) introducing a third diluting agent and a second alkoxysilane containing a carbon-carbon double bonded group to the extruder, followed by mixing, and carrying out reactive extrusion of a silane-grafted polyolefin composition, wherein the first alkoxysilane containing a carbon-carbon double bonded group has a higher boiling point as compared to the second alkoxysilane containing a carbon-carbon double bonded group.

Herein, polyolefin is the same as described hereinafter.

In addition, the diluting agent is the same as described hereinafter.

Meanwhile, according to an embodiment of the present disclosure, description of the first diluting agent, the second diluting agent and the third diluting agent may refer to the following description of the diluting agent. Herein, the first diluting agent, the second diluting agent and the third diluting agent may be the same as or different from one another.

According to an embodiment of the present disclosure, the first alkoxysilane containing a carbon-carbon double bonded group is a crosslinking agent inducing silane crosslinking, is grafted to polyolefin through vinyl groups, and functions to perform crosslinking of polyolefin through aqueous crosslinking caused by alkoxy groups.

According to the present disclosure, the first alkoxysilane containing a carbon-carbon double bonded group has a higher boiling point as compared to the second alkoxysilane containing a carbon-carbon double bonded group described hereinafter. As used herein, the first alkoxysilane containing a carbon-carbon double bonded group refers to the alkoxysilane containing a carbon-carbon double bonded group introduced previously to the extruder. As used herein, the second alkoxysilane containing a carbon-carbon double bonded group refers to the alkoxysilane containing a carbon-carbon double bonded group introduced subsequently to the extruder.

When using a vinylsilane having a high boiling point, such as the first alkoxysilane containing a carbon-carbon double bonded group, it is possible to reduce the amount of alkoxysilane containing a carbon-carbon double bonded group which evaporates under the high-temperature condition of the extruder. Therefore, it is possible to reduce the problem of die-drool caused by fume generation during the extrusion of a sheet, thereby providing improved processability. However, there is a problem in that the first alkoxysilane containing a carbon-carbon double bonded group has a high molecular weight to cause degradation of reactivity with polyolefin.

On the contrary, when using the second alkoxysilane containing a carbon-carbon double bonded group as described hereinafter, the grafting ratio of polyolefin with silane is high. It seems that such a high grafting ratio results from high mobility of molecules derived from the low molecular weight of the second alkoxysilane containing a carbon-carbon double bonded group. However, in the case of the second alkoxysilane containing a carbon-carbon double bonded group, it may cause an appearance-related problem, such as die-drool, when it has a long retention time in the extruder.

Under these circumstances, the boiling point of the alkoxysilane containing a carbon-carbon double bonded group and the retention time thereof in the extruder are controlled at the same time according to the present disclosure to reduce a die-drool phenomenon and to provide a crosslinked polyolefin separator having improved processability and workability.

According to an embodiment of the present disclosure, the first alkoxysilane containing a carbon-carbon double bonded group may have a boiling point of 150-200° C., 155-190° C., or 160-180° C.

According to an embodiment of the present disclosure, the first alkoxysilane containing a carbon-carbon double bonded group may include vinyltriethoxysilane (b.p. 160° C.), vinyltriisopropoxysilane (b.p. 180° C.), vinyltriacetoxysilane (b.p. 175° C.), or a mixture of at least two of them.

According to an embodiment of the present disclosure, the content of the first alkoxysilane containing a carbon-carbon double bonded group may be 0.1-3.0 parts by weight, 0.2-2.0 parts by weight, or 0.3-1.5 parts by weight, based on 100 parts by weight of the total content of the polyolefin, the first diluting agent, the second diluting agent and the third diluting agent. When the content of the first alkoxysilane containing a carbon-carbon double bonded group satisfies the above-defined range, it is possible to prevent the problems of a decrease in crosslinking degree, caused by a low silane content and reduced graft ratio, and degradation of the appearance of an extruded sheet, caused by a high silane content and residue of unreacted silane.

According to an embodiment of the present disclosure, the ratio of the elapsed time from the introduction of the first alkoxysilane containing a carbon-carbon double bonded group to the extrusion based on the elapsed time from the introduction of the polyolefin to the extrusion may be 0.6-0.9, 0.65-0.85, or 0.7-0.8. When the retention time of the first alkoxysilane containing a carbon-carbon double bonded group in the extruder satisfies the above-defined range, it is possible to reduce the problem of poor grafting of the first alkoxysilane containing a carbon-carbon double bonded group to the polyolefin, caused by an excessively short extrusion time, and to blend the first alkoxysilane containing a carbon-carbon double bonded group with the polyolefin more effectively by preliminarily blending the polyolefin with the first diluting agent.

Then, the third diluting agent and the second alkoxysilane containing a carbon-carbon double bonded group may be introduced to and mixed in the extruder, and reactive extrusion of a silane-grafted polyolefin composition may be carried out (S13).

According to an embodiment of the present disclosure, description of the third diluting agent may be the same as the description of the first diluting agent.

According to an embodiment of the present disclosure, the third diluting agent may be the same as or different from each of the first diluting agent and the second dilution agent as described above.

According to an embodiment of the present disclosure, the total content of the first diluting agent, the second diluting agent and the third diluting agent may be 100-350 parts by weight, 125-300 parts by weight, or 150-250 parts by weight based on 100 parts by weight of the polyolefin. When the total content of the first diluting agent, the second diluting agent and the third diluting agent satisfies the above-defined range, it is possible to reduce the problems caused by an increase in polyolefin content, such as a decrease in porosity and pore size, reduced interconnection among pores and a significant decrease in permeability, an increase in viscosity of a polyolefin composition and extrusion load, and a difficulty in processing. It is also possible to reduce the problems caused by a decrease in polyolefin content, such as breakage upon orientation and non-uniform thickness, caused by a decrease in compatibility of polyolefin with the first diluting agent, the second diluting agent and the third diluting agent and extrusion of polyolefin in the form of gel without thermodynamic blending of polyolefin with the first diluting agent, the second diluting agent and the third diluting agent.

According to an embodiment of the present disclosure, the weight ratio of the first diluting agent to the second diluting agent may be 4:3-7:1.5. The weight ratio of the first diluting agent to the third diluting agent may be 4:3-7:1.5. When the weight ratio of the first diluting agent, the second diluting agent and the third diluting agent satisfies the above-defined ranges, it is possible to preliminarily blend the polyolefin having high viscosity with the first diluting agent and to introduce the crosslinking additives smoothly into the extruder together with the second diluting agent and the third diluting agent.

According to the present disclosure, the first diluting agent may be introduced simultaneously with the polyolefin in order to increase the compatibility with the polyolefin. Then, the second diluting agent and the first alkoxysilane containing a carbon-carbon double bonded group may be introduced to the extruder, and then the third diluting agent and the second alkoxysilane containing a carbon-carbon double bonded group may be further introduced to the extruder at the time interval described hereinafter.

According to an embodiment of the present disclosure, the second alkoxysilane containing a carbon-carbon double bonded group is a crosslinking agent inducing silane crosslinking, is grafted to polyolefin through vinyl groups, and functions to perform crosslinking of polyolefin through aqueous crosslinking caused by alkoxy groups. However, according to an embodiment of the present disclosure, the second alkoxysilane containing a carbon-carbon double bonded group has a lower boiling point as compared to the first alkoxysilane containing a carbon-carbon double bonded group as described above.

According to an embodiment of the present disclosure, the second alkoxysilane containing a carbon-carbon double bonded group may have a boiling point of 70-140° C., 90-135° C., or 100-130° C.

According to an embodiment of the present disclosure, the second alkoxysilane containing a carbon-carbon double bonded group may include vinyltrimethoxysilane (b.p. 123° C.), vinyl(chlorodimethyl)silane (b.p. 83° C.), or a mixture thereof.

According to an embodiment of the present disclosure, the content of the second alkoxysilane containing a carbon-carbon double bonded group may be 0.1-3.0 parts by weight, 0.2-2.0 parts by weight, or 0.3-1.5 parts by weight, based on 100 parts by weight of the total content of the polyolefin, the first diluting agent, the second diluting agent and the third diluting agent. When the content of the second alkoxysilane containing a carbon-carbon double bonded group satisfies the above-defined range, it is possible to prevent the problems of a decrease in crosslinking degree, caused by a low silane content and reduced graft ratio, and degradation of the appearance of an extruded sheet, caused by a high silane content and residue of unreacted silane.

According to an embodiment of the present disclosure, the weight ratio of the first alkoxysilane containing a carbon-carbon double bonded group to the second alkoxysilane containing a carbon-carbon double bonded group may be 8:2-2:8, 3:7-7:3, or 4:6-6:4. When the weight ratio of the alkoxysilanes containing a carbon-carbon double bonded group satisfies the above-defined range, both the first alkoxysilane containing a carbon-carbon double bonded group having a relatively high boiling point and the second alkoxysilane containing a carbon-carbon double bonded group having a relatively low boiling point can contribute to the crosslinking of the polyolefin, thereby further improving the meltdown temperature.

According to an embodiment of the present disclosure, the ratio of the elapsed time from the introduction of the second alkoxysilane containing a carbon-carbon double bonded group to the extrusion based on the elapsed time from the introduction of the polyolefin and the first diluting agent to the extrusion may be 0.2-0.5, 0.25-0.45, or 0.3-0.4. When the retention time of the second alkoxysilane containing a carbon-carbon double bonded group satisfies the above-defined range, it is possible to avoid the problem of degradation of appearance, caused by an excessively long retention time of the second alkoxysilane containing a carbon-carbon double bonded group, and to reduce the problem of poor grafting to the polyolefin, caused by an excessively short retention time of the second alkoxysilane containing a carbon-carbon double bonded group in the extruder.

As described above, since the first alkoxysilane containing a carbon-carbon double bonded group is introduced previously to the extruder according to the present disclosure, the retention time of the first alkoxysilane containing a carbon-carbon double bonded group in the extruder is controlled to be longer than the retention time of the second alkoxysilane containing a carbon-carbon double bonded group in the extruder.

In other words, according to the present disclosure, the retention time of the first alkoxysilane containing a carbon-carbon double bonded group having lower reactivity with the polyolefin is controlled to a longer time in order to allow the first alkoxysilane to sufficiently react with the polyolefin. On the other hand, the retention time of the second alkoxysilane containing a carbon-carbon double bonded group is controlled to a shorter time, since the second alkoxysilane having a lower boiling point may cause more fume generation when it has a long retention time in the extruder, resulting in the problem of an appearance-related problem.

According to an embodiment of the present disclosure, the initiator may be any initiator, as long as it can generate radicals. Non-limiting examples of the initiator include 2,5-dimethyl-2,5-di(tert-butylperoxy)hexane (DHBP), benzoyl peroxide, acetyl peroxide, dilauryl peroxide, di-tert-butyl peroxide, dicumyl peroxide, cumyl peroxide, hydrogen peroxide, potassium persulfate, or the like.

According to an embodiment of the present disclosure, the content of the initiator may be 0.1-20 parts by weight, 0.5-10 parts by weight, or 1-5 parts by weight, based on 100 parts by weight of the total content of the first alkoxysilane containing a carbon-carbon double bonded group and the second alkoxysilane containing a carbon-carbon double bonded group. When the content of the initiator satisfies the above-defined range, it is possible to prevent the problems of a decrease in silane graft ratio, caused by a low content of initiator, and crosslinking between polyethylene molecules in an extruder, caused by a high content of initiator.

According to another embodiment of the present disclosure, the initiator is introduced and mixed in divided doses in step (S1), wherein the weight ratio (A/B) of the total content (A) of the alkoxysilane containing a carbon-carbon double bonded group to the total content (B) of the initiator is 80-600.

When polyolefin, an initiator, alkoxysilane containing a carbon-carbon double bonded group and a crosslinking catalyst are introduced to an extruder at once according to the related art, the initiator may work on the alkoxysilane containing a carbon-carbon double bonded group and polyolefin. Particularly, radicals generated in the alkoxysilane containing a carbon-carbon double bonded group by the initiator may react with the polyolefin to cause silane grafting. In addition, radicals generated in the polyolefin by the initiator may react with another polyolefin to cause direct crosslinking between one polyolefin and another polyolefin. The silane grafting and direct polyolefin crosslinking occur competitively in the extruder.

It is required to accelerate the silane grafting, since it reduces the melting point of the silane-grafted polyolefin composition, resulting in a decrease in shutdown temperature and an increase in light transmittance. On the contrary, it is required to minimize the direct crosslinking, since it hardly provides an effect of increasing light transmittance.

Under these circumstances, according to the present disclosure, the initiator provided to the extruder is introduced and mixed in divided doses at a predetermined interval, wherein the weight ratio (A/B) of the total content (A) of the alkoxysilane containing a carbon-carbon double bonded group to the total content (B) of the initiator is controlled to 80-600.

Particularly, it is preferred that the diluting agent and the alkoxysilane containing a carbon-carbon double bonded group are introduced and mixed in divided doses with a view to accelerating the silane grafting and minimizing the direct polyolefin crosslinking.

According to an embodiment of the present disclosure, the weight ratio (A/B) of the total content (A) of the alkoxysilane containing a carbon-carbon double bonded group to the total content (B) of the initiator may be 80-600, 100-500, 100-400, or 125-350.

When the weight ratio (A/B) of the total content (A) of the alkoxysilane containing a carbon-carbon double bonded group to the total content (B) of the initiator is less than 80, it is not possible to provide a sufficient effect of increasing light transmittance. When the weight ratio (A/B) of the total content (A) of the alkoxysilane containing a carbon-carbon double bonded group to the total content (B) of the initiator is larger than 600, alkoxy group-containing vinylsilane present in the extruder may be increased, or drooling may occur at a die or lip.

According to an embodiment of the present disclosure, the initiator may be introduced to the extruder in divided doses at a predetermined time interval, together with at least one of the diluting agent, aloxysilane containing a carbon-carbon double bonded group or the crosslinking catalyst, in step (S1).

According to an embodiment of the present disclosure, step (S1) may include:
  introducing the polyolefin to the extruder;
  introducing a pre-introduced composition containing a part of the diluting agent, initiator, alkoxysilane containing a carbon-carbon double bonded group and the crosslinking catalyst to the extruder, followed by mixing; and
  introducing a post-introduced composition containing the remaining part of the diluting agent, initiator, alkoxysilane containing a carbon-carbon double bonded group and the crosslinking catalyst to the extruder at a predetermined time interval, followed by mixing, and then carrying out reactive extrusion of a silane-grafted polyolefin composition.

Herein, the weight ratio (a/b) of the alkoxysilane (a) containing a carbon-carbon double bonded group to the initiator (b) in the pre-introduced composition may be 100-700, and the weight ratio (c/d) of the alkoxysilane (c) containing a carbon-carbon double bonded group to the initiator (d) in the post-introduced composition may be smaller than the weight ratio (a/b) of the alkoxysilane (a) containing a carbon-carbon double bonded group to the initiator (b) in the pre-introduced composition.

According to the present disclosure, the ratio of the alkoxysilane containing a carbon-carbon double bonded group to the initiator may be controlled by using at least two inlet ports in the extruder. Herein, it is possible to maximize the silane grafting and to minimize the direct polyolefin crosslinking by controlling the weight ratio (a/b) of the alkoxysilane (a) containing a carbon-carbon double bonded group to the initiator (b) in the composition introduced previously to the first hopper to be larger than the weight ratio (c/d) of the alkoxysilane (c) containing a carbon-carbon double bonded group to the initiator (d) in the composition introduced subsequently to the second hopper.

According to an embodiment of the present disclosure, the weight ratio (a/b) of the alkoxysilane (a) containing a carbon-carbon double bonded group to the initiator (b) in the pre-introduced composition may be 3-15 times, 3.5-13 times, or 4.49-10.5 times higher than the weight ratio (c/d) of the alkoxysilane (c) containing a carbon-carbon double bonded group to the initiator (d) in the post-introduced composition.

Within the above-defined range, it is possible to control a change in pressure during extrusion processing and to optimize the transportability of the blended molten material.

According to an embodiment of the present disclosure, the weight ratio (a/b) of the alkoxysilane (a) containing a carbon-carbon double bonded group to the initiator (b) in the pre-introduced composition may be 100-700, 200-650, or 300-600. Within the above-defined range, it is possible to maximize the grafting ratio of the alkoxysilane containing a carbon-carbon double bonded group.

According to an embodiment of the present disclosure, the weight ratio (c/d) of the alkoxysilane (c) containing a carbon-carbon double bonded group to the initiator (d) in the post-introduced composition may be 20-400, 30-300, 40-250, or 57.1-66.7. Within the above-defined range, it is possible to maximize the grafting ratio of the alkoxysilane containing a carbon-carbon double bonded group.

According to an embodiment of the present disclosure, the ratio (t2/t1) of the elapsed time (t2) from the introduction of the post-introduced composition to the extrusion based on the elapsed time (t1) from the introduction of the pre-introduced composition to the extrusion may be 0.3-0.8, 0.4-0.75, or 0.5-0.7. Within the above-defined range of elapsed time, it is possible to control the grafting rate of the alkoxysilane containing a carbon-carbon double bonded group and to inhibit side reactions.

When the above-mentioned processing conditions (such as a/b, c/d, t2/t1) are satisfied, the extruded sheet obtained through the extruder may include 0.5-10, 1.0-8.0, or 1.4-8.0 units to which alkoxysilane containing a carbon-carbon double bonded group is grafted, based on 1000 carbon atoms in the polyolefin backbone. When the number of units to which alkoxysilane containing a carbon-carbon double bonded group is grafted is within the above-defined range, it is possible to increase the light transmittance of a separator.

According to an embodiment of the present disclosure, the polyolefin may be polyethylene; polypropylene; polybutylene; polypentene; polyhexene; polyoctene; a copolymer of at least two of ethylene, propylene, butene, pentene, 4-methylpentene, hexene, heptene and octene; or a mixture thereof.

Particularly, the polyethylene includes low-density polyethylene (LDPE), linear low-density polyethylene (LLDPE), high-density polyethylene (HDPE), or the like. Among those, high-density polyethylene having a high crystallization degree and a high resin melting point is most preferred.

According to an embodiment of the present disclosure, the polyolefin may have a weight average molecular weight of 200,000-1,000,000, 220,000-700,000, or 250,000-500,000. According to the present disclosure, it is possible to obtain a separator having excellent strength and heat resistance, while ensuring separator film uniformity and film-forming processability, by using high-molecular weight polyolefin having a weight average molecular weight of 200,000-1,000,000 as a starting material.

According to an embodiment of the present disclosure, the diluting agent may include liquid or solid paraffin oil, mineral oil, wax, soybean oil, or the like, used currently for manufacturing a separator through a wet process.

According to an embodiment of the present disclosure, the diluting agent may be one capable of liquid-liquid phase separation against polyolefin. For example, the diluting agent may be a phthalic acid ester, such as dibutyl phthalate, dihexyl phthalate, dioctyl phthalate, or the like; aromatic ether, such as diphenyl ether, benzyl ether, or the like; C10-C20 fatty acid, such as palmitic acid, stearic acid, oleic acid, linolic acid, linoleic acid, or the like; C10-C20 fatty acid alcohol, such as palmitic acid alcohol, stearic acid alcohol, oleic acid alcohol, or the like; and a fatty acid ester such as palmitic acid mono-, di- or tri-ester, stearic acid mono-, di- or tri-ester, oleic acid mono-, di- or tri-ester, linoleic acid mono-, di- or tri-ester, or the like, resulting from an esterification between saturated or unsaturated fatty acid whose fatty acid group has 4-26 carbon atoms; or a one or at least two fatty acids having an epoxy-substituted double bond of unsaturated fatty acid, and a C1-C10 alcohol having 1-8 hydroxyl groups.

The diluting agent may include any one of the above-described ingredients or a mixture of at least two of them.

According to an embodiment of the present disclosure, the content of the diluting agent may be 100-350 parts by weight, 125-300 parts by weight, or 150-250 parts by weight, based on 100 parts by weight of polyolefin. When the total content of the diluting agent satisfies the above-defined range, it is possible to reduce the problems caused by an increase in polyolefin content, such as a decrease in porosity and pore size, reduced interconnection among pores and a significant decrease in permeability, an increase in viscosity of a polyolefin composition and extrusion load, and a difficulty in processing. It is also possible to reduce the problems caused by a decrease in polyolefin content, such as breakage upon orientation and non-uniform thickness, caused by a decrease in compatibility of polyolefin with a diluting agent and extrusion of polyolefin in the form of gel without thermodynamic blending of polyolefin with a diluting agent.

According to an embodiment of the present disclosure, the alkoxysilane containing a carbon-carbon double bonded group is a crosslinking agent inducing silane crosslinking, is grafted to polyolefin through vinyl groups, and functions to perform crosslinking of polyolefin through aqueous crosslinking caused by alkoxy groups.

According to an embodiment of the present disclosure, the alkoxysilane containing a carbon-carbon double bonded group may include a compound represented by the following Chemical Formula 1:

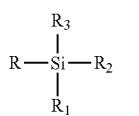

[Chemical Formula 1]

wherein each of $R_1$, $R_2$ and $R_3$ independently represents a C1-C10 alkoxy group or C1-C10 alkyl group, with the proviso that at least one of $R_1$, $R_2$ or $R_3$ represents an alkoxy group; and R represents a vinyl group, acryloxy group, methacryloxy group, or a C1-C20 alkyl group, wherein at least one hydrogen atom of the alkyl group is substituted with a vinyl group, acryl group, or methacryl group.

Meanwhile, R may further include an amino group, epoxy group or an isocyanate group.

According to an embodiment of the present disclosure, the alkoxysilane containing a carbon-carbon double bonded group may include vinyltrimethoxysilane, vinyltriethoxysilane, vinyltriacetoxysilane, (3-methacryloxypropyl)trimethoxysilane, (3-methacryloxypropyl)triethoxysilane, vinylmethyl dimethoxysilane, vinyl-tris(2-methoxyethoxy)silane, vinylmethyldiethoxysilane, or a mixture of at least two of them.

According to an embodiment of the present disclosure, the initiator may be any initiator, as long as it can generate radicals. Non-limiting examples of the initiator include 2,5-dimethyl-2,5-di(tert-butylperoxy)hexane (DHBP), benzoyl peroxide, acetyl peroxide, dilauryl peroxide, di-tert-butyl peroxide, dicumyl peroxide, cumyl peroxide, hydrogen peroxide, potassium persulfate, or the like.

According to an embodiment of the present disclosure, the crosslinking catalyst is added to accelerate silane crosslinking.

According to an embodiment of the present disclosure, the crosslinking catalyst may be a carboxylate of metal, such as tin, zinc, iron, lead or cobalt, organic base, inorganic acid or an organic acid. Non-limiting examples of the crosslinking catalyst include metal carboxylates, such as dibutyltin dilaurate, dibutyltin diacetate, stannous acetate, stannous caprylate, zinc naphthenate, zinc caprylate and cobalt naphthenate, organic bases, such as ethylamine, dibutylamine, hexylamine and pyridine, inorganic acids, such as sulfuric acid and hydrochloric acid, and organic acids, such as toluene sulfonic acid, acetic acid, stearic acid and maleic acid. Such crosslinking agents may be used alone or in combination.

According to an embodiment of the present disclosure, the content of the crosslinking catalyst may be 0.1-20 parts by weight, 0.5-10 parts by weight, or 1-5 parts by weight, based on 100 parts by weight of the alkoxysilane containing a carbon-carbon double bonded group. When the content of the crosslinking catalyst satisfies the above-defined range, it is possible to carry out silane crosslinking to a desired level and to prevent undesired side reactions in a lithium secondary battery. In addition, there is no cost-related problem, such as waste of the catalyst.

According to an embodiment of the present disclosure, the content of the alkoxysilane containing a carbon-carbon double bonded group may be 0.01-1 parts by weight, or 0.05-0.7 parts by weight, based on 100 parts by weight of the total content of the polyolefin and the diluting agent. When the content of the alkoxysilane containing a carbon-carbon double bonded group satisfies the above-defined range, it is possible to prevent the problems of a decrease in crosslinking degree, caused by a low silane content and reduced graft ratio, and degradation of the appearance of an extruded sheet, caused by a high silane content and residue of unreacted silane.

According to an embodiment of the present disclosure, if necessary, the silane-grafted polyolefin composition may further include conventional additives for improving specific functions, such as an antioxidant, UV stabilizer, antistatic agent, nucleating agent, or the like.

According to an embodiment of the present disclosure, the reactive extrusion may be carried out by using a uniaxial extruder or biaxial extruder.

Next, the reactive extruded silane-grafted polyolefin composition is molded in the form of a sheet and oriented (S2).

For example, the reactive extruded silane-grafted polyolefin composition is extruded by using an extruder equipped with a T-die, or the like, and then cooled extrudate may be formed by using a general casting or calendaring process using water-cooling or air-cooling mode.

According to an embodiment of the present disclosure, it is possible to provide a separator having improved mechanical strength and puncture strength through the orientation step as mentioned above.

According to an embodiment of the present disclosure, the orientation may be carried out by sequential or simultaneous orientation using a roll or tenter. The orientation ratio may be 3 times or more, or 4-10 times, each in the machine direction and transverse direction. When the orientation ratio satisfies the above-defined ratio, it is possible to prevent the problem of insufficient orientation in one direction, a failure in balance of physical properties between the machine direction and the transverse direction, and degradation of tensile strength and puncture strength. When the total orientation ratio satisfies the above-defined range, it is possible to prevent the problems of non-orientation or a failure in pore formation.

According to an embodiment of the present disclosure, the orientation temperature may be varied with the melting point of polyolefin and concentration and type of the diluting agent.

According to an embodiment of the present disclosure, when the polyolefin is polyethylene and the diluting agent is liquid paraffin, the orientation temperature may be 70-160° C., 90-140° C., or 100-130° C. in the machine direction (MD), and may be 90-180° C., 110-160° C., or 120-150° C. in the transverse direction (TD). When carrying out orientation in both directions at the same time, the orientation temperature may be 90-180° C., 110-160° C., or 110-150° C.

When the orientation temperature satisfies the above-defined range, it is possible to prevent the problem of breakage or non-orientation caused by the lack of softness resulting from a low orientation temperature. In addition, it is possible to prevent over-orientation or a difference in physical properties, caused by a high orientation temperature.

Then, the diluting agent is totally extracted from the oriented sheet to obtain a porous membrane (S3).

According to an embodiment of the present disclosure, the diluting agent may be extracted from the porous membrane by using an organic solvent, and then the porous membrane may be dried.

According to an embodiment of the present disclosure, the organic solvent is not particularly limited, as long as it is capable of extraction of the diluting agents. However, it is suitable to use methyl ethyl ketone, methylene chloride or hexane having high extraction efficiency and showing a high drying rate.

According to an embodiment of the present disclosure, the extraction may be any conventional solvent extraction process, such as an immersion process, solvent spray process or ultrasonication process, and such processes may be used alone or in combination. After carrying out extraction, the content of residual diluting agents should be preferably 1 wt % or less. When the content of residual diluting agents is larger than 1 wt %, physical properties are degraded and permeability of the porous membrane is reduced. The content of residual diluting agents may be affected by extraction temperature and extraction time. To increase the solubility of diluting agents in the organic solvent, a higher extraction temperature is preferred. However, considering the safety problem caused by boiling of the organic solvent, the extraction temperature is preferably 40° C. or lower. When the extraction temperature equals to or is lower than the solidifying point of the diluting agent, extraction efficiency may be decreased significantly. Thus, the extraction temperature should be higher than the solidifying point of the diluting agent.

In addition, the extraction time may be varied with the thickness of a porous membrane. In the case of a porous membrane having a thickness of 5-15 μm, the extraction time may be 1-4 minutes suitably.

Then, the porous membrane is thermally fixed (S4).

The thermal fixing is a process of fixing and heating the porous membrane so that the porous membrane to be shrunk may be fixed forcibly to remove residual stress.

According to an embodiment of the present disclosure, the thermal fixing temperature may be 100-140° C., 105-135° C., or 110-130° C.

When the polyolefin is polyethylene and the thermal fixing temperature satisfies the above-defined range, polyolefin molecules may be rearranged to remove residual stress of the porous membrane, and the problem of pore blocking of the porous membrane caused by partial melting may be reduced.

According to an embodiment of the present disclosure, the thermal fixing time may be 10-120 seconds, 20-90 seconds, or 30-60 seconds. When the thermal fixing is carried out for the above-defined range of time, polyolefin molecules may be rearranged to remove residual stress of the porous membrane, and the problem of pore blocking of the porous membrane caused by partial melting may be reduced.

After that, the thermally fixed porous membrane is crosslinked in the presence of water (S5).

According to an embodiment of the present disclosure, the crosslinking may be carried out at 60-100° C., 65-95° C., or 70-90° C.

According to an embodiment of the present disclosure, the crosslinking may be carried out under a humidity of 60-95% for 6-50 hours.

Meanwhile, according to an embodiment of the present disclosure, when the alkoxysilane containing a carbon-carbon double bonded group is introduced in divided doses, step (S5) may be carried out at a temperature of 60-90° C. under a relative humidity of 50-85% for 6-18 hours.

Particularly, the crosslinking may be carried out at a temperature of 60-90° C., 60-80° C., or 60-70° C. Herein, the crosslinking may be carried out under a humidity of 50-85% for 6-18 hours, 10-16 hours, or 12-16 hours. Thus, it is possible to reduce the shutdown temperature by controlling the temperature, humidity and time in the crosslinking step after silane grafting is carried out. In this manner, it is possible to provide a crosslinked polyolefin separator having high light transmittance. Herein, it is required to totally satisfy the above-defined ranges of temperature, humidity and time in order to provide such a crosslinked polyolefin separator having high light transmittance.

In another aspect of the present disclosure, there is provided a crosslinked polyolefin separator obtained by the above-described method.

According to an embodiment of the present disclosure, there is provided a crosslinked polyolefin separator which shows an average value of light transmittance of 30% or more, 40% or more, 58% or more, or 63% or more, in a region of 380 nm to 700 nm, after four sides of the separator are fixed and allowed to stand at 130° C. for 30 minutes.

As used herein, 'light transmittance' may be calculated by the formula of {(Amount of light before passing through separator−Amount of light after passing through separator)/Amount of light before passing through separator}×100, when horizontal light is allowed to pass through a separator in the thickness direction.

According to an embodiment of the present disclosure, the average value of light transmittance may be 30% or more, 58% or more, 60-80%, 62-75%, or 63-67%, when light in a region of 380 nm to 700 nm passes through the separator. When the light transmittance satisfies the above-defined range, it is possible to improve the safety of a lithium secondary battery through pore blocking caused by shutdown. Particularly, when pores are present in a separator, the separator itself seems opaque due to a difference in refractive index between polyolefin and air. However, when the temperature increases above the shutdown temperature, air cannot pass through the separator due to pore blocking, and thus air is interrupted. Therefore, it is possible to obtain a separator including polyolefin only and interrupted from air, and to provide a separator having high light transmittance.

According to an embodiment of the present disclosure, the light transmittance may be determined by using a hazemeter according to ASTM-D1003. Particularly, light transmittance may be determined by measuring light transmittance as a function of wavelength in the visible light range of 380-700 nm, followed by averaging.

According to an embodiment of the present disclosure, the separator may have a thickness of 4-12 μm, or 6-12 μm.

According to an embodiment of the present disclosure, the separator may be applied to a lithium secondary battery.

Examples will be described more fully hereinafter so that the present disclosure can be understood with ease. The following examples may, however, be embodied in many different forms and should not be construed as limited to the exemplary embodiments set forth therein. Rather, these exemplary embodiments are provided so that the present disclosure will be thorough and complete, and will fully convey the scope of the present disclosure to those skilled in the art.

Example 1 (Introducing Alkoxysilane Containing Carbon-Carbon Double Bonded Group in Divided Doses)

First, 7.0 kg of high-density polyethylene (Korea Petrochemical Ind. Co. Ltd., VH035) having a weight average molecular weight of 350,000 as polyolefin, and 6.5 kg of liquid paraffin oil (Kukdong Oil & Chem. LP350F, 68 cSt) as the first diluting agent were introduced to an extruder and mixed therein.

Next, 3.9 kg of liquid paraffin oil (Kukdong Oil & Chem. LP350F, 68 cSt) as the second diluting agent, 100 g of vinyltriethoxysilane (b.p. 160° C.) (as the first alkoxysilane containing a carbon-carbon double bonded group), 4 g of dibutyltin dilaurate (as a crosslinking catalyst), and 4 g of 2,5-dimethyl-2,5-di(tert-butylperoxy)hexane (DHBP) (as an initiator) were further introduced to and mixed in the extruder.

Then, 2.6 kg of liquid paraffin oil (Kukdong Oil & Chem. LP350F, 68 cSt) as the third diluting agent and 100 g of vinyltrimethoxysilane (b.p. 123° C.) (as the second alkoxysilane containing a carbon-carbon double bonded group) were introduced to and mixed in the extruder to carry out reactive extrusion of the silane-grafted polyolefin composition.

Therefore, in Example 1, the weight ratio of the first alkoxysilane containing a carbon-carbon double bonded group to the second alkoxysilane containing a carbon-carbon double bonded group was 50:50.

In addition, in example 1, the weight ratio of the first diluting agent to the second diluting agent was 5:3, and the weight ratio of the first diluting agent to the third diluting agent was 5:2.

Meanwhile, the ratio of the elapsed time from the introduction of the first alkoxysilane containing a carbon-carbon double bonded group to the extrusion based on the elapsed time from the introduction of the polyolefin to the extrusion was 80%. In other words, the elapsed time from the introduction of the first alkoxysilane containing a carbon-carbon double bonded group to the extrusion was about 0.8 times of the elapsed time from the introduction of the polyolefin to the extrusion. Particularly, the elapsed time from the introduction of the polyolefin to the extrusion was 210 seconds, and the elapsed time from the introduction of the first alkoxysilane containing a carbon-carbon double bonded group to the extrusion was 169 seconds.

In addition, the ratio of the elapsed time from the introduction of the second alkoxysilane containing a carbon-carbon double bonded group to the extrusion based on the elapsed time from the introduction of the polyolefin to the extrusion was 40%. In other words, the elapsed time from the introduction of the second alkoxysilane containing a carbon-carbon double bonded group to the extrusion was about 0.4 times of the elapsed time from the introduction of the polyolefin to the extrusion. Particularly, the elapsed time from the introduction of the polyolefin to the extrusion was 210 seconds, and the elapsed time from the introduction of the second alkoxysilane containing a carbon-carbon double bonded group to the extrusion was 85 seconds.

After that, reactive extrusion was carried out at a temperature of 200° C. to obtain a silane-grafted polyethylene composition.

The resultant silane-grafted polyethylene composition was molded into a sheet-like shape through a T-die and cold casting roll, and then biaxial orientation was carried out by using a tenter-type sequential orienting machine performing MD orientation and then TD orientation. Both the MD orientation ratio and the TD orientation ratio were 7.0 times. The orientation temperature was 110° C. in MD and 125° C. in TD.

Then, the first diluting agent, the second diluting agent and the third diluting agent were extracted from the oriented sheet by using methylene chloride and thermal fixing was carried out at 126° C. to obtain a porous membrane. The porous membrane was subjected to crosslinking at 65° C. under a relative humidity condition of 65% for 18 hours to obtain a crosslinked polyethylene separator. The resultant crosslinked polyolefin separator had a thickness of 8.9 μm.

Example 2

A crosslinked polyolefin separator was obtained in the same manner as Example 1, except that the crosslinking was carried out for 9 hours. The resultant crosslinked polyolefin separator had a thickness of 8.9 μm.

Comparative Example 1 (Introducing No Crosslinking Additives)

A separator was obtained in the same manner as Example 1, except that the materials introduced to the extruder were controlled as follows. The resultant polyolefin separator had a thickness of 9.1 μm.

Particularly, 7.0 kg of high-density polyethylene (Korea Petrochemical Ind. Co. Ltd., VH035) having a weight average molecular weight of 350,000 as polyolefin, and 13.0 kg of liquid paraffin oil (Kukdong Oil & Chem. LP350F, 68 cSt) as a diluting agent were introduced to an extruder and mixed therein.

Comparative Example 2 (Introducing First Alkoxysilane Containing Carbon-Carbon Double Bonded Group Having High Boiling Point Alone at Once, Not Introducing Alkoxysilane Containing Carbon-Carbon Double Bonded Group in Divided Doses)

In Comparative Example 2, the second alkoxysilane containing a carbon-carbon double bonded group and the third diluting agent were not introduced, unlike Example 1.

Particularly, a separator was obtained as follows:
First, 7.0 kg of high-density polyethylene (Korea Petrochemical Ind. Co. Ltd., VH035) having a weight average molecular weight of 350,000 as polyolefin, and 9.1 kg of liquid paraffin oil (Kukdong Oil & Chem. LP350F, 68 cSt) as the first diluting agent were introduced to an extruder and mixed therein.

Next, 3.9 kg of liquid paraffin oil (Kukdong Oil & Chem. LP350F, 68 cSt) as the second diluting agent, 200 g of vinyltriethoxysilane (b.p. 160° C.) (as the first alkoxysilane containing a carbon-carbon double bonded group), 4 g of dibutyltin dilaurate (as a crosslinking catalyst), and 4 g of 2,5-dimethyl-2,5-di(tert-butylperoxy)hexane (DHBP) (as an initiator) were further introduced to and mixed in the extruder.

In Comparative Example 2, the weight ratio of the first diluting agent to the second diluting agent was 7:3.

Meanwhile, the ratio of the elapsed time from the introduction of the first alkoxysilane containing a carbon-carbon double bonded group to the extrusion based on the elapsed time from the introduction of the polyolefin to the extrusion was 80%. In other words, the elapsed time from the introduction of the first alkoxysilane containing a carbon-carbon double bonded group to the extrusion was about 0.8 times of the elapsed time from the introduction of the polyolefin to the extrusion. Particularly, the elapsed time from the introduction of the polyolefin to the extrusion was 210 seconds, and the elapsed time from the introduction of the first alkoxysilane containing a carbon-carbon double bonded group to the extrusion was 169 seconds.

After that, reactive extrusion was carried out at a temperature of 200° C. to obtain a silane-grafted polyethylene composition.

The resultant silane-grafted polyethylene composition was molded into a sheet-like shape through a T-die and cold casting roll, and then biaxial orientation was carried out by using a tenter-type sequential orienting machine performing MD orientation and then TD orientation. Both the MD orientation ratio and the TD orientation ratio were 7.0 times. The orientation temperature was 110° C. in MD and 125° C. in TD.

Then, the first diluting agent and the second diluting agent were extracted from the oriented sheet by using methylene chloride and thermal fixing was carried out at 126° C. to obtain a porous membrane. The porous membrane was subjected to crosslinking at 85° C. under a relative humidity condition of 85% for 24 hours to obtain a crosslinked polyethylene separator. The resultant crosslinked polyolefin separator had a thickness of 8.9 μm.

Comparative Example 3 (Introducing Second Alkoxysilane Containing Carbon-Carbon Double Bonded Group Having Low Boiling Point Alone at Once, Not Introducing Alkoxysilane Containing Carbon-Carbon Double Bonded Group in Divided Doses)

In Comparative Example 3, the first alkoxysilane containing a carbon-carbon double bonded group and the second diluting agent were not introduced, unlike Example 1.

Particularly, a separator was obtained as follows:

First, 7.0 kg of high-density polyethylene (Korea Petrochemical Ind. Co. Ltd., VH035) having a weight average molecular weight of 350,000 as polyolefin, and 10.4 kg of liquid paraffin oil (Kukdong Oil & Chem. LP350F, 68 cSt) as the first diluting agent were introduced to an extruder and mixed therein.

Next, 2.6 kg of liquid paraffin oil (Kukdong Oil & Chem. LP350F, 68 cSt) as the third diluting agent, 200 g of vinyltrimethoxysilane (b.p. 123° C.) (as the second alkoxysilane containing a carbon-carbon double bonded group), 4 g of dibutyltin dilaurate (as a crosslinking catalyst), and 4 g of 2,5-dimethyl-2,5-di(tert-butylperoxy)hexane (DHBP) (as an initiator) were further introduced to and mixed in the extruder to carry out reactive extrusion of the silane-grafted polyolefin composition. Herein, the weight ratio of the first diluting agent to the third diluting agent was 8:2.

The ratio of the elapsed time from the introduction of the second alkoxysilane containing a carbon-carbon double bonded group to the extrusion based on the elapsed time from the introduction of the polyolefin to the extrusion was 40%. In other words, the elapsed time from the introduction of the second alkoxysilane containing a carbon-carbon double bonded group to the extrusion was about 0.4 times of the elapsed time from the introduction of the polyolefin to the extrusion. Particularly, the elapsed time from the introduction of the polyolefin to the extrusion was 210 seconds, and the elapsed time from the introduction of the second alkoxysilane containing a carbon-carbon double bonded group to the extrusion was 85 seconds.

After that, reactive extrusion was carried out at a temperature of 200° C. to obtain a silane-grafted polyethylene composition.

The resultant silane-grafted polyethylene composition was molded into a sheet-like shape through a T-die and cold casting roll, and then biaxial orientation was carried out by using a tenter-type sequential orienting machine performing MD orientation and then TD orientation. Both the MD orientation ratio and the TD orientation ratio were 7.0 times. The orientation temperature was 110° C. in MD and 125° C. in TD.

Then, the first diluting agent and the third diluting agent were extracted from the oriented sheet by using methylene chloride and thermal fixing was carried out at 126° C. to obtain a porous membrane. The porous membrane was subjected to crosslinking at 85° C. under a relative humidity condition of 85% for 24 hours to obtain a crosslinked polyethylene separator. The resultant crosslinked polyolefin separator had a thickness of 8.9 μm.

Comparative Example 4 (Introducing Polyolefin, First Alkoxysilane Containing Carbon-Carbon Double Bonded Group and Second Alkoxysilane Containing Carbon-Carbon Double Bonded Group at Once to Extruder)

A separator was obtained in the same manner as Example 1, except that polyolefin, the first diluting agent, the first alkoxysilane containing a carbon-carbon double bonded group and the second alkoxysilane containing a carbon-carbon double bonded group were introduced at once to the extruder.

Particularly, the above-mentioned materials were introduced to the extruder as follows:

First, 7.0 kg of high-density polyethylene (Korea Petrochemical Ind. Co. Ltd., VH035) having a weight average molecular weight of 350,000 as polyolefin, 13.0 kg of liquid paraffin oil (Kukdong Oil & Chem. LP350F, 68 cSt) as the first diluting agent, 100 g of vinyltriethoxysilane (b.p. 160° C.) (as the first alkoxysilane containing a carbon-carbon double bonded group), 100 g of vinyltrimethoxysilane (b.p. 123° C.) (as the second alkoxysilane containing a carbon-carbon double bonded group), 4 g of dibutyltin dilaurate (as a crosslinking catalyst), and 4 g of 2,5-dimethyl-2,5-di(tert-butylperoxy)hexane (DHBP) (as an initiator) were introduced to and mixed in the extruder to carry out reactive extrusion of the silane-grafted polyolefin composition.

Herein, the weight ratio of the first alkoxysilane containing a carbon-carbon double bonded group to the second alkoxysilane containing a carbon-carbon double bonded group was 50:50.

The resultant crosslinked polyolefin separator had a thickness of 9.1 μm.

Test Example 1

TABLE 1

|  | Ex. 1 | Ex. 2 | Comp. Ex. 1 | Comp. Ex. 2 | Comp. Ex. 3 | Comp. Ex. 4 |
| --- | --- | --- | --- | --- | --- | --- |
| Thickness (μm) | 8.9 | 8.9 | 9.1 | 8.9 | 8.9 | 9.1 |
| Air permeability (sec/100 cc) | 135 | 135 | 157 | 145 | 145 | 131 |
| Meltdown temperature (° C.) | 193 | 189 | 148 | 173 | 175 | 193 |
| Evaluation of separator appearance | O | O | O | O | O | X |
| Light transmittance (%) | 38 | 52 | 14 | 19 | 21 | 28 |
| Si grafting ratio (No./1000 C.) | 1.2 | 1.2 | 0 | 0.1 | 0.2 | 0.4 |

In Table 1, each evaluation item is determined by the following methods.

1) Method for Determining Thickness of Separator

The thickness of a separator was determined by using a thickness measuring system (VL-50S-B available from Mitutoyo Co.).

2) Method for Determining Air Permeability

Air permeability was determined by using a Gurley type air permeability tester according to JIS P-8117. Herein, the time required for 100 mL of air to pass through a diameter of 28.6 mm and an area of 645 mm² was determined.

3) Method for Determining Meltdown Temperature

The meltdown temperature of a crosslinked polyethylene separator was determined by using a thermomechanical analyzer (TMA). Particularly, a load of 0.01N was applied to the separator, and how much it was deformed was observed while the temperature was increased at a rate of 5° C./min. The temperature at which point the separator was shrunk and then elongated and broken was determined as 'meltdown temperature of separator'. As the meltdown temperature is increased, it can be stated that the separator retains melt integrity at high temperature and has dimensional stability.

4) Method for Evaluating Separator Appearance

After carrying out extrusion for 8 hours or more during the manufacture of a crosslinked polyethylene separator, it was visually determined whether any defect, such as a die-drool phenomenon, appeared or not at the T-die. The results are shown in Table 1.

<Evaluation Criteria>
o: No defects in appearance appear on a sheet
Δ: Defects in appearance partially appear on a sheet
☐: Severe defects in appearance appear to show poor workability 5) Determination of Silane (Si) Grafting Ratio The Si grafting ratio means the quantitatively determined number of silane-grafted units based on 1000 carbon atoms in the polyolefin backbone. The Si grafting ratio was obtained by measuring Si content through the inductively coupled plasma (ICP) analysis of a separator and converting the measurement into a Si grafting ratio.

6) Method for Determining Light Transmittance

The light transmittance was determined by using a hazemeter (available from Gardner BYK) based on ASTM-D1003.

Particularly, each of the separators according to Examples 1 and 2 and Comparative Examples 1-4 was fixed at its four sides and allowed to stand at 130° C. for 30 minutes. Then, the light transmittance, when light in a region of 380-700 nm was allowed to pass through each separator, was measured three times and the average value was calculated.

Herein, the light transmittance can be calculated by the formula of {(Amount of light before passing through separator−Amount of light after passing through separator)/Amount of light before passing through separator}×100.

As can be seen from Table 1, in the case of Examples 1 and 2 in which both the introduction point of the first alkoxysilane containing a carbon-carbon double bonded group and that of the second alkoxysilane containing a carbon-carbon double bonded group are controlled, no die-drool phenomenon occurs and each separator shows a high meltdown temperature. In addition, in the case of Examples 1 and 2 in which the crosslinking time, temperature and relative humidity during crosslinking are controlled, the light transmittance is higher as compared to Comparative Examples and the silane grafting ratio is also high.

On the contrary, in the case of Comparative Example 2 in which the first alkoxysilane containing a carbon-carbon double bonded group having a high boiling point is introduced alone, the separator has good appearance, but shows a meltdown temperature of 173° C., which is lower than a desired meltdown temperature according to the present disclosure.

In the case of Comparative Example 3 in which the second alkoxysilane containing a carbon-carbon double bonded group having a low boiling point is introduced alone, no die-drool phenomenon occurs by virtue of a decreased retention time in the extruder, but the separator shows a meltdown temperature of 175° C., which is lower than a desired meltdown temperature according to the present disclosure, due to such a decreased retention time in the extruder.

Meanwhile, in the case of Comparative Example 1, no crosslinking additives (alkoxysilane containing a carbon-carbon double bonded group, initiator, crosslinking catalyst, or the like) are introduced, and thus shows the highest air permeability and the lowest meltdown temperature. Thus, Comparative Example 1 provides a separator having physical properties opposite to desired physical properties according to the present disclosure.

In the case of Comparative Example 4, polyolefin, a diluting agent and alkoxysilane containing a carbon-carbon double bonded group are introduced at once to the extruder according to the related art, and thus the boiling point of alkoxysilane containing a carbon-carbon double bonded group and the retention time thereof in the extruder are not considered. In this case, a die-drool phenomenon occurs to provide poor appearance. Thus, the separator according to Comparative Example 4 is not suitable as a separator for use in an electrochemical device.

Test Example 2

Example 3 (Introducing Initiator in Divided Doses, A/B=125)

First, 10.5 kg of high-density polyethylene (Korea Petrochemical Ind. Co. Ltd., VH035) having a weight average molecular weight of 350,000 as polyolefin was introduced to an extruder hopper.

Next, 13.65 kg/hr of liquid paraffin oil (Kukdong Oil & Chem. LP350F, 68 cSt) (as a diluting agent), 1 g/hr of 2,5-dimethyl-2,5-di(tert-butylperoxy)hexane (DHBP) (as an initiator (b)), 300 g/hr of vinyltrimethoxysilane (as alkoxysilane (a) containing a carbon-carbon double bonded group), and 6 g/hr of dibutyltin dilaurate (as a crosslinking catalyst) were introduced at once to the first port of the extruder, as a pre-introduced composition, and then mixed therein. In the pre-introduced composition, the weight ratio (a/b) of the alkoxysilane (a) containing a carbon-carbon double bonded group to the initiator (b) was 300.

Then, 5.85 kg/hr of liquid paraffin oil (Kukdong Oil & Chem. LP350F, 68 cSt) (as a diluting agent), 3 g/hr of 2,5-dimethyl-2,5-di(tert-butylperoxy)hexane (DHBP) (as an initiator (d)), and 200 g/hr of vinyltrimethoxysilane (as alkoxysilane (c) containing a carbon-carbon double bonded group) were introduced at once to the second port of the extruder, as a post-introduced composition, and then mixed therein. In the post-introduced composition, the weight ratio (c/d) of the alkoxysilane (c) containing a carbon-carbon double bonded group to the initiator (d) was 67.

Herein, the ratio (t2/t1) of the elapsed time (t2) from the introduction of the post-introduced composition to the extrusion based on the elapsed time (t1) from the introduction of the pre-introduced composition to the extrusion was 0.66. Particularly, the elapsed time (t1) from the introduction of the pre-introduced composition to the extrusion was 383 seconds, and the elapsed time (t2) from the introduction of the post-introduced composition to the extrusion was 252 seconds. In addition, the total content of the alkoxysilane containing a carbon-carbon double bonded group was 125 times of the total content of the initiator.

After that, reactive extrusion was carried out at a temperature of 200° C. to obtain a silane-grafted polyethylene composition.

The resultant silane-grafted polyethylene composition was molded into a sheet-like shape through a T-die and cold casting roll, and then biaxial orientation was carried out by using a tenter-type sequential orienting machine performing MD orientation and then TD orientation. Both the MD orientation ratio and the TD orientation ratio were 7.0 times. The orientation temperature was 110° C. in MD and 125° C. in TD.

Then, the diluting agent was extracted from the oriented sheet by using methylene chloride and thermal fixing was carried out at 126° C. to obtain a porous membrane. The porous membrane was subjected to crosslinking at 85° C. under a relative humidity condition of 85% for 24 hours to obtain a crosslinked polyethylene separator. The resultant crosslinked polyolefin separator had a thickness of 9.0 μm.

Example 4 (Introducing Initiator in Divided Doses, A/B=125)

A crosslinked polyolefin separator was obtained in the same manner as Example 3, except that the content of each ingredient in the compositions introduced to the extruder and time were controlled as shown in the following Table 2.

Example 5 (Introducing Initiator in Divided Doses, A/B=600)

A crosslinked polyolefin separator was obtained in the same manner as Example 3, except that the weight ratio (A/B) of the total content (A) of the alkoxysilanes containing a carbon-carbon double bonded group to the total content (B) of the initiators introduced to the first port and the second port of the extruder was controlled to 600.

Particularly, 13.65 kg/hr of liquid paraffin oil (Kukdong Oil & Chem. LP350F, 68 cSt) (as a diluting agent), 0.5 g/hr of 2,5-dimethyl-2,5-di(tert-butylperoxy)hexane (DHBP) (as an initiator (b)), 400 g/hr of vinyltrimethoxysilane (as alkoxysilane (a) containing a carbon-carbon double bonded group), and 6 g/hr of dibutyltin dilaurate (as a crosslinking catalyst) were introduced at once to the first port of the extruder, as a pre-introduced composition, and then mixed therein. In the pre-introduced composition, the weight ratio (a/b) of the alkoxysilane (a) containing a carbon-carbon double bonded group to the initiator (b) was 800.

Then, 5.85 kg/hr of liquid paraffin oil (Kukdong Oil & Chem. LP350F, 68 cSt) (as a diluting agent), 1 g/hr of 2,5-dimethyl-2,5-di(tert-butylperoxy)hexane (DHBP) (as an initiator (d)), and 500 g/hr of vinyltrimethoxysilane (as alkoxysilane (c) containing a carbon-carbon double bonded group) were introduced at once to the second port of the extruder, as a post-introduced composition, and then mixed therein. In the post-introduced composition, the weight ratio (c/d) of the alkoxysilane (c) containing a carbon-carbon double bonded group to the initiator (d) was 500.

Example 6 (Introducing in Divided Doses, A/B=125)

A crosslinked polyolefin separator was obtained in the same manner as Example 3, except that the initiator was introduced merely to the first port of the extruder.

Particularly, 13.65 kg/hr of liquid paraffin oil (Kukdong Oil & Chem. LP350F, 68 cSt) (as a diluting agent), 4 g/hr of 2,5-dimethyl-2,5-di(tert-butylperoxy)hexane (DHBP) (as an initiator (b)), 300 g/hr of vinyltrimethoxysilane (as alkoxysilane (a) containing a carbon-carbon double bonded group), and 6 g/hr of dibutyltin dilaurate (as a crosslinking catalyst) were introduced at once to the first port of the extruder, as a pre-introduced composition, and then mixed therein. In the pre-introduced composition, the weight ratio (a/b) of the alkoxysilane (a) containing a carbon-carbon double bonded group to the initiator (b) was 75.

Then, 5.85 kg/hr of liquid paraffin oil (Kukdong Oil & Chem. LP350F, 68 cSt) (as a diluting agent), and 200 g/hr of vinyltrimethoxysilane (as alkoxysilane (c) containing a carbon-carbon double bonded group) were introduced at once to the second port of the extruder, as a post-introduced composition, and then mixed therein. In the post-introduced composition, the weight ratio (c/d) of the alkoxysilane (c) containing a carbon-carbon double bonded group to the initiator (d) was 0.

Comparative Example 5 (Introducing No Crosslinking Additives)

A crosslinked polyolefin separator was obtained in the same manner as Example 3, except that merely polyolefin and the diluting agent were introduced to the extruder. Herein, polyolefin was introduced to the extruder hopper and the diluting agent was introduced through the first port.

Particularly, the content of each ingredient in the compositions introduced to the extruder and time were controlled as shown in the following Table 2.

Comparative Example 6 (Introducing Initiator at Once)

Polyolefin was introduced to the extruder hopper, and a part of the diluting agent, initiator, alkoxysilane containing a carbon-carbon double bonded group and the crosslinking catalyst were introduced at once through the first port. However, another part of the diluting agent was introduced in a divided dose at a predetermined time interval through the second port.

Particularly, a crosslinked polyolefin separator was obtained in the same manner as Example 3, except that the content of each ingredient in the compositions introduced to the extruder and time were controlled as shown in the following Table 2.

Comparative Example 7

A crosslinked polyolefin separator was obtained in the same manner as Example 3, except that the weight ratio (A/B) of the total content (A) of the alkoxysilane containing a carbon-carbon double bonded group to the total content (B) of the initiator introduced to the first port and the second port of the extruder was controlled to 62.5.

Particularly, 13.65 kg/hr of liquid paraffin oil (Kukdong Oil & Chem. LP350F, 68 cSt) (as a diluting agent), 1 g/hr of 2,5-dimethyl-2,5-di(tert-butylperoxy)hexane (DHBP) (as an initiator (b)), 100 g/hr of vinyltrimethoxysilane (as alkoxysilane (a) containing a carbon-carbon double bonded group), and 6 g/hr of dibutyltin dilaurate (as a crosslinking catalyst) were introduced at once to the first port of the extruder, as a pre-introduced composition, and then mixed therein. In the pre-introduced composition, the weight ratio (a/b) of the alkoxysilane (a) containing a carbon-carbon double bonded group to the initiator (b) was 100.

Then, 5.85 kg/hr of liquid paraffin oil (Kukdong Oil & Chem. LP350F, 68 cSt) (as a diluting agent), 3 g/hr of 2,5-dimethyl-2,5-di(tert-butylperoxy)hexane (DHBP) (as an initiator (d)), and 150 g/hr of vinyltrimethoxysilane (as alkoxysilane (c) containing a carbon-carbon double bonded group) were introduced at once to the second port of the extruder, as a post-introduced composition, and then mixed therein. In the post-introduced composition, the weight ratio (c/d) of the alkoxysilane (c) containing a carbon-carbon double bonded group to the initiator (d) was 50.

TABLE 2

|  | Ex. 3 | Ex. 4 | Comp. Ex. 5 | Comp. Ex. 6 | Comp. Ex. 7 | Ex. 5 | Ex. 6 |
| --- | --- | --- | --- | --- | --- | --- | --- |
| Introduced to hopper | polyolefin 10.5 kg/hr | polyolefin 10.5 kg/hr | polyolefin 10.5 kg/hr | polyolefin 10.5 kg/hr | polyolefin 10.5 kg/hr | polyolefin 10.5 kg/hr | polyolefin 10.5 kg/hr |
| Introduced to the first port | diluting agent 13.65 kg/hr, initiator 1 g/hr, alkoxysilane containing carbon-carbon double bonded group 300 g/hr, crosslinking catalyst 6 g/hr | diluting agent 13.65 kg/hr, initiator 0.5 g/hr, alkoxysilane containing carbon-carbon double bonded group 300 g/hr, crosslinking catalyst 6 g/hr | diluting agent 13.65 kg/hr | diluting agent 13.65 kg/hr, initiator 4 g/hr, alkoxysilane containing carbon-carbon double bonded group 500 g/hr, crosslinking catalyst 6 g/hr | diluting agent 13.65 kg/hr, initiator 1 g/hr, alkoxysilane containing carbon-carbon double bonded group 100 g/hr, crosslinking catalyst 6 g/hr | diluting agent 13.65 kg/hr, initiator 0.5 g/hr, alkoxysilane containing carbon-carbon double bonded group 400 g/hr, crosslinking catalyst 6 g/hr | diluting agent 13.65 kg/hr, initiator 4 g/hr, alkoxysilane containing carbon-carbon double bonded group 300 g/hr, crosslinking catalyst 6 g/hr |
| Introduced to the second port | diluting agent 5.85 kg/hr, initiator 3 g/hr, alkoxysilane containing carbon-carbon double bonded group 200 g/hr | diluting agent 5.85 kg/hr, initiator 3.5 g/hr, alkoxysilane containing carbon-carbon double bonded group 200 g/hr | diluting agent 5.85 kg/hr | diluting agent 5.85 kg/hr | diluting agent 5.85 kg/hr, initiator 3 g/hr, alkoxysilane containing carbon-carbon double bonded group 150 g/hr | diluting agent 5.85 kg/hr, initiator 1 g/hr, alkoxysilane containing carbon-carbon double bonded group 500 g/hr | diluting agent 5.85 kg/hr, alkoxysilane containing carbon-carbon double bonded group 200 g/hr |
| Weight ratio (A/B) of total content (A) of alkoxysilane containing carbon-carbon double bonded group to total content (B) of initiator | 125 | 125 | — | 125 | 62.5 | 600 | 125 |

TABLE 2-continued

|  | Ex. 3 | Ex. 4 | Comp. Ex. 5 | Comp. Ex. 6 | Comp. Ex. 7 | Ex. 5 | Ex. 6 |
|---|---|---|---|---|---|---|---|
| Weight ratio (a/b) of alkoxysilane (a) containing carbon-carbon double bonded group to initiator (b) in pre-introduced composition | 300 | 600 | — | — | 100 | 800 | 75 |
| Weight ratio (c/d) of alkoxysilane (c) containing carbon-carbon double bonded group to initiator (d) in post-introduced composition | 66.7 | 57.1 | — | — | 50 | 500 | ∞ |
| (a/b)/(c/d) | 4.49 | 10.5 | — | — | 2 | 1.6 | 0 |
| Si grafting ratio | 1.4/1000 C. | 1.4/1000 C. | 0/1000 C. | 0.3/1000 C. | 0.1/1000 C. | 0.8/1000 C. | 0.6/1000 C. |
| Ratio (t2/t1) of elapsed time (t2) from introduction of post-introduced composition to extrusion based on elapsed time (t1) from introduction of pre-introduced composition to extrusion | 0.66 | 0.66 | — | — | 0.66 | 0.66 | 0.66 |
| Light transmittance (%) | 63 | 67 | 16 | 28 | 14 | 52 | 41 |
| Thickness of separator (μm) | 9.0 | 9.0 | 9.0 | 9.0 | 9.0 | 9.0 | 9.0 |
| Processability | Good | Good | Good | Good | Good | Die-drool occurs | Pressure in extruder is increased and filter blocking occurs |
| Note | Different amount of initiator | Different amount of initiator | No crosslinking additives are introduced | Crosslinking additives are added at once | Total content of alkoxysilane containing carbon-carbon double bonded | Total content of alkoxysilane containing carbon-carbon double bonded | Total content of alkoxysilane containing carbon-carbon double bonded |

TABLE 2-continued

| | Ex. 3 | Ex. 4 | Comp. Ex. 5 | Comp. Ex. 6 | Comp. Ex. 7 | Ex. 5 | Ex. 6 |
|---|---|---|---|---|---|---|---|
| | | | | | group is less than 80 times of total content of initiator | group is larger than 600 times of total content of initiator | group is 80-600 times of total content of initiator, and initiator is introduced merely to pre-introduced composition |

It can be seen from the foregoing that each of the separators according to Examples 3 and 4 of the present disclosure shows silane grafting formed at an adequate Si grafting ratio, thereby providing excellent processability as well as high light transmittance.

On the contrary, each of the separators according to Comparative Examples 5-7 shows a Si grafting ratio of 0 or low Si grafting ratio, thereby providing significantly low light transmittance.

In addition, each of Examples 5 and 6 shows silane grafting formed at an adequate Si grafting ratio, and thus provides better physical properties in terms of light transmittance, as compared to Comparative Examples 5-7. However, each separator causes problem related with processability, such as generation of a die-drool phenomenon or an increase in internal pressure in the extruder or filter blocking, and thus is not preferred in terms of processability.

What is claimed is:

1. A method for manufacturing a crosslinked polyolefin separator, comprising:
   (S1) introducing a polyolefin, a diluting agent, an alkoxysilane containing a carbon-carbon double bonded group, an initiator and a crosslinking catalyst to an extruder, followed by mixing, and carrying out a reactive extrusion;
   (S2) molding and orienting a reactive extruded silane-grafted polyolefin composition in the form of an oriented sheet;
   (S3) extracting the diluting agent from the oriented sheet to obtain a porous membrane;
   (S4) thermally fixing the porous membrane to obtain a thermally fixed porous membrane; and
   (S5) crosslinking the thermally fixed porous membrane in the presence of water,
   wherein, in (S1), at least one of the initiator or the alkoxysilane containing a carbon-carbon double bonded group is introduced to the extruder in divided doses at a predetermined time interval and mixed in the extruder, and
   if the initiator is introduced and mixed in divided doses, then a weight ratio (A/B) of a total content (A) of the alkoxysilane containing the carbon-carbon double bonded group to a total content (B) of the initiator is 80-600, and
   if the alkoxysilane containing the carbon-carbon double bonded group is introduced and mixed in divided doses, then a first alkoxysilane containing the carbon-carbon double bonded group introduced initially to the extruder has a higher boiling point, as compared to a second alkoxysilane containing the carbon-carbon double bonded group introduced subsequently to the extruder.

2. The method for manufacturing the crosslinked polyolefin separator according to claim 1, wherein the initiator comprises 2,5-dimethyl-2,5-di(tert-butylperoxy)hexane (DHBP), benzoyl peroxide, acetyl peroxide, dilauryl peroxide, di-tert-butyl peroxide, dicumyl peroxide, cumyl peroxide, hydrogen peroxide, potassium persulfate, or a mixture of at least two thereof.

3. The method for manufacturing a crosslinked polyolefin separator according to claim 1, wherein:
   the diluting agent comprises a first diluting agent, a second diluting agent, and a third diluting agent,
   (S1) comprises:
      (S11) introducing the polyolefin and the first diluting agent to the extruder, followed by mixing;
      (S12) introducing the second diluting agent, the first alkoxysilane containing a carbon-carbon double bonded group, the initiator and the crosslinking catalyst to the extruder, followed by mixing; and
      (S13) introducing the third diluting agent and the second alkoxysilane containing a carbon-carbon double bonded group to the extruder, followed by mixing, and carrying out the reactive extrusion,
   wherein the first alkoxysilane containing the carbon-carbon double bonded group has a higher boiling point as compared to the second alkoxysilane containing the carbon-carbon double bonded group.

4. The method for manufacturing the crosslinked polyolefin separator according to claim 3, wherein the first alkoxysilane containing the carbon-carbon double bonded group has a boiling point of 150-200° C., and the second alkoxysilane containing the carbon-carbon double bonded group has a boiling point of 70-140° C.

5. The method for manufacturing the crosslinked polyolefin separator according to claim 3, wherein a weight ratio of the first alkoxysilane containing the carbon-carbon double bonded group to the second alkoxysilane containing the carbon-carbon double bonded group is 8:2-2:8.

6. The method for manufacturing the crosslinked polyolefin separator according to claim 3, wherein a ratio of an elapsed time from the introducing of the first alkoxysilane containing the carbon-carbon double bonded group to the reactive extrusion based on an elapsed time from the introducing of the polyolefin to the reactive extrusion is 0.6-0.9.

7. The method for manufacturing the crosslinked polyolefin separator according to claim 3, wherein a content of the first alkoxysilane containing the carbon-carbon double bonded group is 0.1-3.0 part by weight based on 100 parts by weight of a total content of the polyolefin, the first diluting agent, the second diluting agent and the third diluting agent.

8. The method for manufacturing the crosslinked polyolefin separator according to claim 3, wherein a content of the second alkoxysilane containing the carbon-carbon double bonded group is 0.1-3.0 part by weight based on 100 parts by weight of a total content of the polyolefin, the first diluting agent, the second diluting agent and the third diluting agent.

9. The method for manufacturing the crosslinked polyolefin separator according to claim 3, wherein (S5) is carried out at 60-90° C. under a relative humidity of 50-85% for 6-18 hours.

10. The method for manufacturing the crosslinked polyolefin separator according to claim 1, wherein (S1) is carried out by introducing and mixing the initiator to the extruder in divided doses at a predetermined time interval, and the weight ratio (A/B) of the total content (A) of the alkoxysilane containing the carbon-carbon double bonded group to the total content (B) of the initiator is 80-600.

11. The method for manufacturing the crosslinked polyolefin separator according to claim 10, wherein the alkoxysilane containing the carbon-carbon double bonded group comprises a compound represented by following Chemical Formula 1:

[Chemical Formula 1]

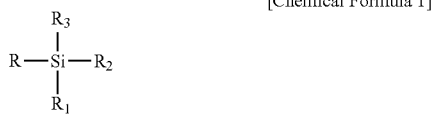

wherein each of $R_1$, $R_2$ and $R_3$ independently represents a C1-C10 alkoxy group or C1-C10 alkyl group, with the proviso that at least one of $R_1$, $R_2$ or $R_3$ represents the C1-C10 alkoxy group; and R represents a vinyl group, acryloxy group, methacryloxy group, or a C1-C20 alkyl group, wherein at least one hydrogen atom of the alkyl group is substituted with a vinyl group, acryl group, or methacryl group.

12. The method for manufacturing the crosslinked polyolefin separator according to claim 10, wherein, in (S1), the initiator along with at least one of the diluting agent, the alkoxysilane containing a carbon-carbon double bonded group or the crosslinking catalyst is introduced to the extruder and mixed in divided doses at the predetermined time interval.

13. The method for manufacturing the crosslinked polyolefin separator according to claim 12, wherein (S1) comprises:

introducing the polyolefin to the extruder;

introducing a pre-introduced composition containing a part of the diluting agent, a part of the initiator, a part of the alkoxysilane containing the carbon-carbon double bonded group and a part of the crosslinking catalyst to the extruder, followed by mixing; and introducing a post-introduced composition containing a remaining part of the diluting agent, a remaining part of the initiator, a remaining part of the alkoxysilane containing the carbon-carbon double bonded group and a remaining part of the crosslinking catalyst to the extruder at the predetermined time interval, followed by mixing, and then carrying out the reactive extrusion, wherein a weight ratio (a/b) of (a) the part of the alkoxysilane containing the carbon-carbon double bonded group to (b) the part of the initiator in the pre-introduced composition is 100-700, and a weight ratio (c/d) of (c) the remaining part of the alkoxysilane containing the carbon-carbon double bonded group to (d) the remaining part of the initiator in the post-introduced composition is smaller than the weight ratio (a/b).

14. The method for manufacturing the crosslinked polyolefin separator according to claim 13, wherein the weight ratio (c/d) of the remaining part of the alkoxysilane (c) containing the carbon-carbon double bonded group to the initiator (d) in the post-introduced composition is 20-400.

15. The method for manufacturing the crosslinked polyolefin separator according to claim 13, wherein the weight ratio (a/b) of the part of the alkoxysilane (a) containing the carbon-carbon double bonded group to the initiator (b) in the pre-introduced composition is 3-15 times higher than the weight ratio (c/d) of the remaining part of the alkoxysilane (c) containing the carbon-carbon double bonded group to the initiator (d) in the post-introduced composition.

16. The method for manufacturing the crosslinked polyolefin separator according to claim 13, wherein a ratio (t2/t1) of an elapsed time (t2) from the introducing of the post-introduced composition to the extrusion based on an elapsed time (t1) from the introducing of the pre-introduced composition to the extrusion is 0.3-0.8.

17. The method for manufacturing the crosslinked polyolefin separator according to claim 13, wherein the weight ratio (a/b) of the alkoxysilane (a) containing the carbon-carbon double bonded group to the initiator (b) in the pre-introduced composition is 300-600.

18. The method for manufacturing the crosslinked polyolefin separator according to claim 13, wherein the weight ratio (c/d) of the alkoxysilane (c) containing the carbon-carbon double bonded group to the initiator (d) in the post-introduced composition is 57.1-66.7.

* * * * *